UNITED STATES PATENT OFFICE.

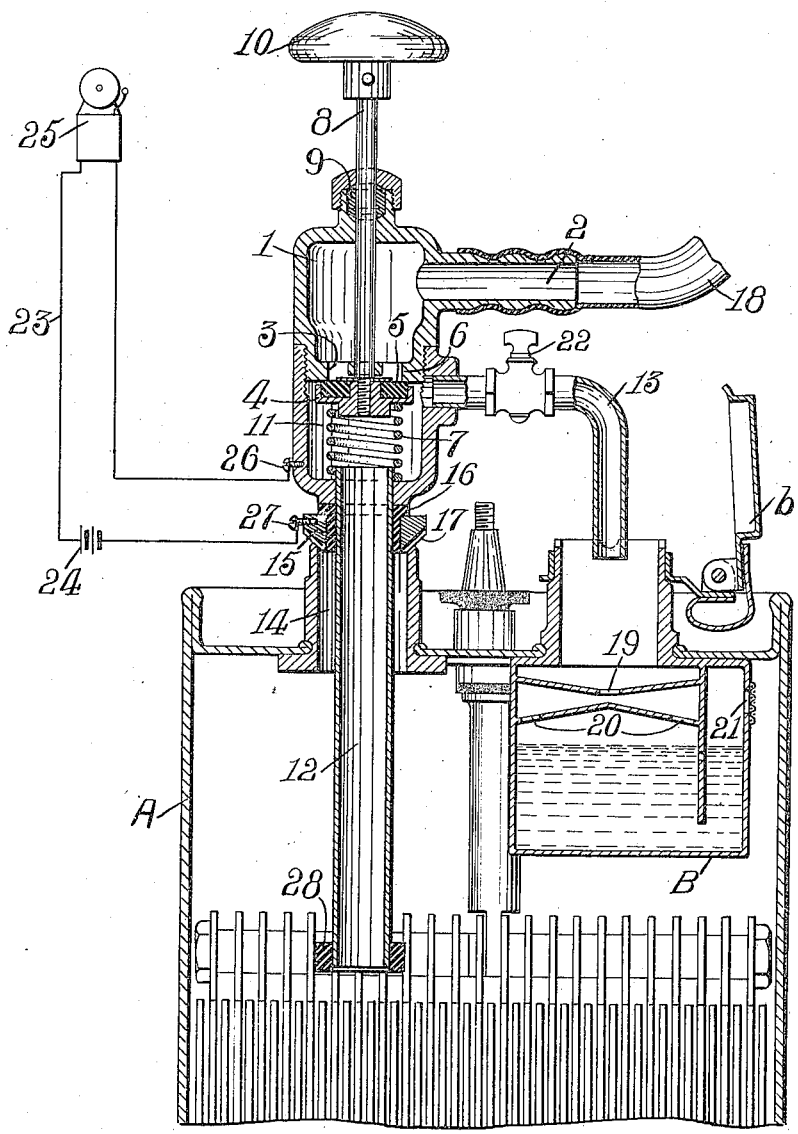

MILLER REESE HUTCHISON, OF WEST ORANGE, NEW JERSEY, ASSIGNOR TO EDISON STORAGE BATTERY COMPANY, OF WEST ORANGE, NEW JERSEY, A CORPORATION OF NEW JERSEY.

FILLING DEVICE OR VALVE FOR STORAGE BATTERIES OR OTHER RECEPTACLES.

1,275,261.   Specification of Letters Patent.   Patented Aug. 13, 1918.

Application filed July 18, 1914. Serial No. 851,765.

*To all whom it may concern:*

Be it known that I, MILLER REESE HUTCHISON, a citizen of the United States, and a resident of Llewellyn Park, West Orange, Essex county, New Jersey, have invented a certain new and useful Filling Device or Valve for Storage Batteries or other Receptacles, of which the following is a description.

My present invention relates to a device or means for filling or replenishing cells of storage batteries or other receptacles, and more particularly for filling or replenishing cells of storage batteries, equipped with safety devices or traps, such as disclosed in Patent No. 1,130,977, granted to me on March 9, 1915 and entitled Safety device.

While the filling of these cells may be carried out through the safety device or trap itself, as set forth in detail in my patent cited above, if a vent or vents is or are provided for the escape of the air or gases, such filling will necessarily be slow and, furthermore, this method of filling does not readily permit the determination of the moment when the proper level of the liquid within the cell or container has been reached. On the other hand, it is necessary not only to periodically replenish the water contained in the safety device or trap but also to wash back into the cell the material, such as caustic potash, deposited in the safety device by the evolution of gases or bubbles, incidental to the charging of the cell.

My invention provides a ready and convenient means for filling these cells of storage batteries or other receptacles, and more particularly cells equipped with a safety device or trap such as that described in my patent above referred to, and for carrying out this operation in an especially speedy manner. In order to avoid overflowing of the electrolyte, I prefer to make use, in conjunction with the filling device described in this specification, of an improved signaling device, forming part of the invention, which is constructed and arranged in such a manner as to insure reliable and certain working.

In order to more clearly explain and define my invention, reference is made to the accompanying drawing forming part of this specification, and which represents a cross section of my invention applied to a storage battery cell equipped with the safety device or trap forming the subject matter of my patent above mentioned.

In said drawing, numeral 1 represents a chamber or case of metal, such as steel, brass, lead or any other suitable metal or alloy, which communicates by the pipe or nipple 2 with a source of supply of the liquid used for filling or replenishing the cell, such as a storage vessel or a water main.

The bottom of the chamber is provided with an aperture or orifice 3 of suitable dimensions, which is normally closed by a valve 4. This valve which may have a body portion provided with a washer or collar 5 of rubber or another elastic material, is held in position with the washer or collar 5 pressed tightly against the lower surface of the annular inwardly projecting flange 6 by a strong spring 7. The valve is also provided with a stem 8 which, passing through the stuffing box 9 in the top of the chamber 1, terminates in a handle or knob 10 of wood or any other suitable material. Numeral 11 represents a second chamber, also of a suitable metal, which is adapted to communicate with the interior of the cell A to be filled by means of the tubular connection or pipe 12, the chamber 11 being in addition provided with an overflow or spigot 13, the outlet of which is so arranged as to be normally located directly above the aperture of the safety device or trap.

When it is desired to fill or replenish a storage battery cell, the cap of the filling opening 14 usually provided in these cells is removed and the tube 12 inserted in said opening, which is commonly of a sleeve-like construction, as shown. The upper part of the tube 12 carries a tapering plug 15 which is adapted to rest against the neck of opening 14. The plug 15 is formed of metal and is insulated from the metallic walls of the chamber 11 and pipe 12 by a bushing 16 of hard rubber or other insulating material. This metal plug is also provided with a number of vents 17 for the purpose of permitting the air to escape during the filling.

The operation of the device is as follows: After my improved apparatus has been inserted in the filling aperture of the cell and placed in such a position that the outlet of the overflow or spigot 13 is immediately above the mouth or inlet of the safety device B, the hinged cover *b* of which has been opened, and the inlet pipe 2 is connected with the supply source of the liquid, by means of a flexible hose 18 or the like, the handle 10 is depressed. The liquid now passes from chamber 1 into chamber 11 and from there through the feed tube 12 into the interior of the cell A, and simultaneously, by way of the overflow and spigot 13 into the safety device or trap B and through the openings 19, 20 and 21 in the said trap into the cell. By increasing or lessening the pressure applied to the handle 10, so as to depress the same more or less, the flow of the liquid into the chamber 11 can be regulated, admitting a larger or smaller amount of the liquid, and if so desired, the flow through the spigot may be made to cease altogether by admitting liquid in no greater quantity than can be carried away by the feed pipe 12. The overflow or spigot 13 may be provided with a cock or valve 22 for the purpose of rendering the same inoperative, if desired.

In order to readily determine the moment when the proper level of liquid in the cell has been reached, and to prevent an overflow of the electrolyte with its entailing dangers and inconveniences, an alarm or signal system is provided. This alarm or signal system preferably consists of an electric circuit 23, comprising a dry cell 24 or the like, and a bell, buzzer, or any other kind of signal 25. The conducting wires of this circuit are attached, as by binding screws 26 and 27 provided for this purpose to the walls of the chamber 11 and to the tapering metallic plug 15, which, as hereinbefore stated, is insulated from the rest of the filling device by a bushing 16 of non-conductive material. As will be readily seen, no current passes through the circuit until the level of the electrolyte reaches the lower end of the tube 12, but as soon as this happens, the tube 12 is electrically connected by the electrolyte to the metallic casing of cell A, and as the said tube and casing are electrically connected to the chamber 11 and the plug 15 respectively, the circuit 23 is closed and the signal 25 set in operation, thus indicating the completion of the filling operation. To safeguard against accidental closing of the circuit, as for instance, by the end of the feed tube 12 coming into contact with the parts of the cell the end of the pipe or tube 12 is provided with a ring or collar 28 of hard rubber or other non-conductive material.

From the above description it will readily be seen that I have, by this invention, provided a safe and speedy filling device for cells of storage batteries and other receptacles of liquids. With my invention, the filling may be carried out very rapidly, as a considerable pressure of the supply liquid may be employed. Furthermore, the replenishing of the liquid in the safety device and the replacing of the potash or other material deposited therein is carried out simultaneously with the filling of the cell, thus materially simplifying the operation. The special arrangement of the signaling device hereinbefore described insures a comparatively high degree of safety against misworking of the same, by an accidental closing of the current before the proper level of the electrolyte has been reached, a very frequent occurrence with similar devices suggested for the purpose.

While, in the foregoing, I have described and set forth my invention in detail, I desire it to be expressely understood that I may modify the same as to shape, dimensions and arrangement, without departing from the spirit of said invention, and while the apparatus is principally intended for the filling and replenishing of cells of storage batteries, it is by no means restricted to use with the same, but may be employed for filling and replenishing various other kinds of receptacles. When used for purposes other than the filling and replenishing of cells of the type described in my patent hereinbefore referred to, the spigot provided for the purpose of renewing the liquid in the safety device and accelerating the filling operation, may be closed by the plug or cock 22 or by a valve especially provided for that purpose, or the flow of liquid from said spigot may be directed to a separate receptacle or back to the storage vessel.

Having now described my invention, what I claim as new and desire to protect by Letters Patent is as follows:

1. A filling device for storage battery and other receptacles, comprising a chamber, and a plurality of pipes extending from said chamber for effecting communication of said chamber with the interior of the receptacle, said pipes and chamber being so arranged that the pipes, during normal operation of said device, simultaneously convey fluid from said chamber and introduce such fluid into said receptacle at different points, substantially as described.

2. A filling device for storage battery and other receptacles, comprising a chamber adapted to communicate with the supply source of liquid and provided with an aperture, a valve for said aperture, means for operating said valve, a second chamber communicating with the first chamber by means of said aperture, and a plurality of pipes extending from said second chamber for effecting communication of the latter with the interior of the receptacle, said pipes and second chamber being so arranged that the pipes, when said valve is fully opened, will simultaneously convey liquid from said second chamber into the receptacle, substantially as described.

3. The combination with a container having a filling opening and a safety device or trap, of a filling device for said container comprising a chamber, means for conveying fluid from said chamber to the interior of the container through said filling opening, and means for simultaneously conveying fluid from said chamber to the interior of the container through said safety device or trap, substantially as described.

4. The combination with a container having a filling opening and a safety device or trap, of a filling device for said container, comprising a chamber and means for simultaneously supplying fluid from said chamber to the interior of said container through said filling opening and through said safety device or trap, substantially as described.

5. The combination with a container having a filling opening, of a filling device for said container comprising a chamber, a conduit leading from said chamber and adapted for insertion in the said container through said opening, and supporting means for said device secured to said conduit and arranged to rest on said container about said opening, said supporting means being provided with venting means for the container, substantially as described.

6. A filling device for storage battery and other receptacles, comprising a hollow conductive member adapted to be inserted into the receptacle, conductive supporting means for said device secured to and insulated from said hollow member and arranged to rest upon the receptacle, said hollow member and supporting means being adapted for connection in an electric circuit, and insulating means surrounding and secured to said hollow member adjacent its lower end, substantially as described.

7. A filling device for storage battery and other receptacles, comprising a chamber, a pair of conduits leading from said chamber for feeding liquid to the receptacle, and unitary means controllable to effect the feeding of liquid from said chamber to the receptacle through one or simultaneously through both of said conduits as desired, substantially as described.

8. The combination with a container having a filling opening and a safety device or trap, of a filling device for said container comprising a chamber, means for supplying fluid from said chamber to the interior of said container through said filling opening, and means for simultaneously supplying a comparatively small quantity of fluid from said chamber to the interior of said container through said safety device or trap, substantially as described.

This specification signed and witnessed this 16th day of July, 1914.

MILLER REESE HUTCHISON.

Witnesses:
FREDERICK BACHMANN,
MARY J. LAIDLAW.